United States Patent
Huang et al.

(10) Patent No.: US 12,328,268 B2
(45) Date of Patent: Jun. 10, 2025

(54) NETWORK SWITCH AND TRANSCEIVER RESTART METHOD THEREOF

(71) Applicant: Zyxel Networks Corporation, New Taipei (TW)

(72) Inventors: Chung-Hsien Huang, Hsinchu (TW); Yueh-O Tseng, Hsinchu (TW); Yao-Hsuan Tseng, Hsinchu (TW)

(73) Assignee: Zyxel Networks Corporation, New Taipei (TW)

( * ) Notice: Subject to any disclaimer, the term of this patent is extended or adjusted under 35 U.S.C. 154(b) by 387 days.

(21) Appl. No.: 17/943,214

(22) Filed: Sep. 13, 2022

(65) Prior Publication Data

US 2023/0239253 A1   Jul. 27, 2023

(30) Foreign Application Priority Data

Jan. 27, 2022   (TW) .................................. 111103526

(51) Int. Cl.
*H04L 49/351*   (2022.01)
*H04Q 11/00*   (2006.01)

(52) U.S. Cl.
CPC ....... *H04L 49/351* (2013.01); *H04Q 11/0005* (2013.01)

(58) Field of Classification Search
CPC .......................... H04L 49/351; H04Q 11/0005
USPC ......................................................... 370/389
See application file for complete search history.

(56) References Cited

U.S. PATENT DOCUMENTS

2010/0216412 A1*   8/2010   Rofougaran ........... H04B 1/406
                                                          455/78
2020/0127862 A1    4/2020   Malicoat et al.

FOREIGN PATENT DOCUMENTS

TW              730592             6/2021

OTHER PUBLICATIONS

"Hsien et al., Optical Transceivers With Closed-Loop Digital Diagnostics, Aug. 3, 2006, WO 2006081025" (Year: 2005).*
"Chin et al., Smart Power Monitoring and Controlling System and Its Implementing Method, Mar. 21, 2016, TW 1526815" (Year: 2014).*
"Office Action of Taiwan Counterpart Application", issued on Oct. 13, 2022, p. 1-p. 17.

* cited by examiner

Primary Examiner — Samina F Choudhry
(74) Attorney, Agent, or Firm — JCIPRNET (57) ABSTRACT

A network switch and a transceiver restart method thereof are provided. The network switch is configured to connect to a transceiver to transmit and receive data packets through the transceiver. The network switch includes a power control circuit and a processor. The power control circuit is controlled to provide electrical power to the transceiver. The processor determines whether the transceiver is in an abnormal state. In response to determining that the transceiver is in the abnormal state, the processor first controls the power control circuit to stop providing the electrical power to the transceiver, and then controls the power control circuit to re-provide the electrical power to the transceiver.

25 Claims, 6 Drawing Sheets

NETWORK SWITCH AND TRANSCEIVER RESTART METHOD THEREOF

CROSS-REFERENCE TO RELATED APPLICATION

This application claims the priority benefit of Taiwan application serial no. 111103526, filed on Jan. 27, 2022. The entirety of the above-mentioned patent application is hereby incorporated by reference herein and made a part of this specification.

BACKGROUND

Technical Field

The disclosure relates to a network switch, and more particularly, to a network switch configured to connect to a transceiver and a method for restarting the transceiver connected.

Description of Related Art

Network switches are widely used in network packet switching. In general, a network switch has an open slot capable of connecting a small form-factor pluggable transceiver (SFP) module or an SFP+ module. However, due to the increasing variety of transceiver types and applications and increasing number of interface options, compatibility problems are prone to occur when the network switches are connected to the transceivers, and the configurations are complicated. Moreover, when the transceiver works abnormally or crashes, users cannot use software commands to repair or restart the transceiver by itself.

SUMMARY

The disclosure provides a network switch and a method for restarting the transceiver connected, which decides whether to restart the transceiver by determining whether the transceiver connected to the network switch is in an abnormal state.

An embodiment of the disclosure provides a network switch. The network switch is configured to connect to a transceiver to transmit and receive data packets through the transceiver. In addition to connecting to the transceiver described above to transmit and receive data packets, the network switch may also connect to other Ethernet transceivers through an Ethernet interface (for example: 10/100/1000Base-T Ethernet interface), and transmit and receive data packets with the Ethernet transceivers to achieve the function of network data exchange and forwarding. The network switch includes but is not limited to a power control circuit and a processor. The power control circuit is coupled to the transceiver, and the power control circuit is controlled to provide electrical power to the transceiver. The processor is coupled to the power control circuit, and the processor determines whether the transceiver is in an abnormal state. In response to determining that the transceiver is in an abnormal state, the processor first controls the power control circuit to stop providing electrical power to the transceiver, and then controls the power control circuit to re-provide electrical power to the transceiver.

Embodiments of the disclosure provide a network switch and a transceiver restart method thereof. The restart method includes, but not limited to, connecting the transceiver to the network switch; determining whether the transceiver is in an abnormal state; and, in response to determining that the transceiver is in the abnormal state, first stopping to provide electrical power to the transceiver, and then re-providing the electrical power to the transceiver.

Based on the above, in some embodiments of the disclosure, when the processor in the network switch determines that the transceiver connected to the network switch is in an abnormal state, the transceiver may be restarted by the power control circuit to overcome the problem that the transceiver cannot be restarted by using software when the transceiver crashes.

In order to make the above-mentioned features and advantages of the disclosure more obvious and easy to understand, the following embodiments are given and described in detail with the accompanying drawings as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

The term "coupled (or connected)" as used throughout this specification (including the scope of the application) may refer to any direct or indirect means of connection. For example, if recites that a first device is coupled (or connected) to a second device, it should be construed that the first device may be directly connected to the second device, or the first device may be indirectly connected to the second device through other devices or some other connection means. Also, wherever possible, elements/components/steps using the same reference numerals in the drawings and embodiments represent the same or similar parts. Relevant descriptions of elements/components/steps that use the same reference numerals or use the same terms in different embodiments may be cross-referenced.

Figure 1:
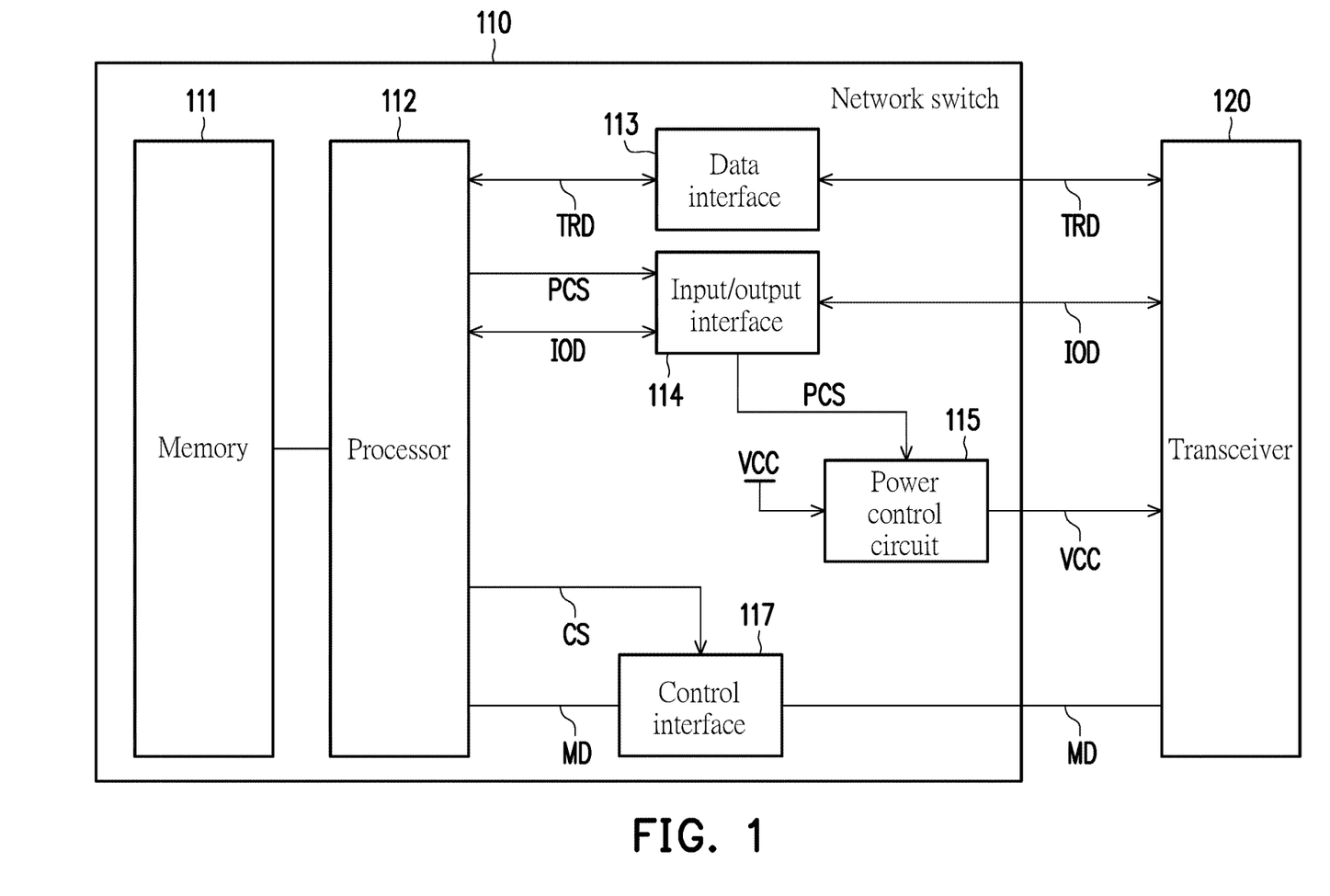
FIG. 1 is a block diagram of a network switch and a transceiver according to an embodiment of the disclosure.

FIG. 1 is a block diagram of a network switch 110 and a transceiver 120 according to an embodiment of the disclosure. The network switch 110 is configured to connect to the transceiver 120 to transmit and receive data packets through the transceiver 120. Connecting to the transceiver 120 refers to physical inserting the transceiver 120 into the network switch 110. The network switch 110 may include, but is not limited to, a memory 111, a processor 112, a data interface 113, an input/output interface 114, a power control circuit 115, and a control interface 117. The transceiver 120 may be an optical or an electrical transceiver, such as a small form-factor pluggable transceiver (SFP), SFP+, QSFP+, SFP28, QSFP28, QSFP, SFP56, QSFP56, QSFP-DD, OSFP, CFP2, CFP8, but the disclosure is not limited to thereto.

The memory 111 is configured to store programs and related data for determining a link status of the transceiver 120. The memory 111 includes, for example, a read only memory (ROM), a storage device, and/or a random access memory (RAM).

The processor 112 is coupled to the memory 111, and the processor 112 is configured to read out application programs and related data from the memory 111 so as to determine the link status of the transceiver 120, and control the power control circuit 115 to restart the transceiver 120 when it is determined that the transceiver 120 is in an abnormal state. In this embodiment, the processor 112 includes, for example, a central processing unit (CPU), a microprocessor, a digital signal processor (DSP), a programmable controller, a programmable logic device (PLD), other similar devices or a combination of thereof, and the disclosure is not limited to thereto.

The data interface 113 is, for example, a serial interface or a parallel interface. The data interface 113 is coupled to the processor 112 so as to transmit transmit-receive data TRD with a plurality of connection lines between the data interface 113 and the processor 112. When the data interface 113 is connected to the transceiver 120, the transmit-receive data TRD may be transmitted through the plurality of connection lines between the data interface 113 and the transceiver 120.

The input/output interface 114 is, for example, a general-purpose input/output (GPIO) interface. The input/output interface 114 is coupled to the processor 112 and the power control circuit 115, and the input/output interface 114 receives a power control signal PCS from the processor 112 and provides input/output data IOD to the processor 112. The input/output interface 114 and the transceiver 120 transmit and receive the input/output data IOD to and from each other. The input/output data IOD includes, for example, a connection report signal, and the connection report signal may indicate the link status between the network switch 110 and the transceiver 120. In one embodiment, the connection report signal may be, for example, an RX loss signal, the value of which may indicate whether or not the signal (e.g. an optical signal or an electrical signal) received by the processor 112 from the transceiver 120 is stable or whether or not the signal can be received from the transceiver 120. For example, when the value of the above-mentioned connection report signal represents a "high voltage level", it may indicate that the signal received by the processor 112 from the transceiver 120 is unstable, or the signal cannot be received from the transceiver 120, and may further indicate that the network switch 110 and the transceiver 120 enter a link down state. On the contrary, when the value of the connection report represents a "low voltage level", it may indicate that the two enter a link up state.

The power control circuit 115 is coupled to the input/output interface 114. The power control circuit 115 is connected to a main power supply which provide a voltage VCC and receives the power control signal PCS from the input/output interface 114. The power control circuit 115 is controlled by the power control signal PCS to decide whether to provide the voltage VCC of the main power supply to the transceiver 120.

The control interface 117 is, for example, an Inter-Integrated Circuit (I²C) bus. The control interface 117 is coupled to the processor 112, and the control interface 117 receives a control signal CS from the processor 112 to monitor the transceiver 120. When the control interface 117 is connected to the transceiver 120, the control interface 117 is controlled by the control signal CS to receive monitoring data MD from the transceiver 120 and provide the monitoring data MD to the processor 112. The monitoring data MD includes, for example, Digital Diagnostic Monitoring Interface (DDMI) parameters.

In one embodiment, the control interface 117 may further include a channel selector (not shown) of any kind. In short, the control interface 117 may be coupled to a plurality of transceivers, and through the channel selector, the control interface 117 may decide which channel between the transceiver and itself is to be enabled. Moreover, when the channel corresponding to the specific transceiver 120 is selected by the channel selector, the channel between the control interface 117 and the transceiver 120 will be enabled. On the contrary, when the channel selector selects another channel (the channel between the control interface 117 and the transceiver 120 is not selected), the channel between the control interface 117 and the transceiver 120 will be cut off. When the control interface 117 receives the control signal CS transmitted by the processor 112, it may cut off or connect the control interface 117 and the transceiver 120 through the channel selector according to the instruction of the control signal CS.

Figure 2:
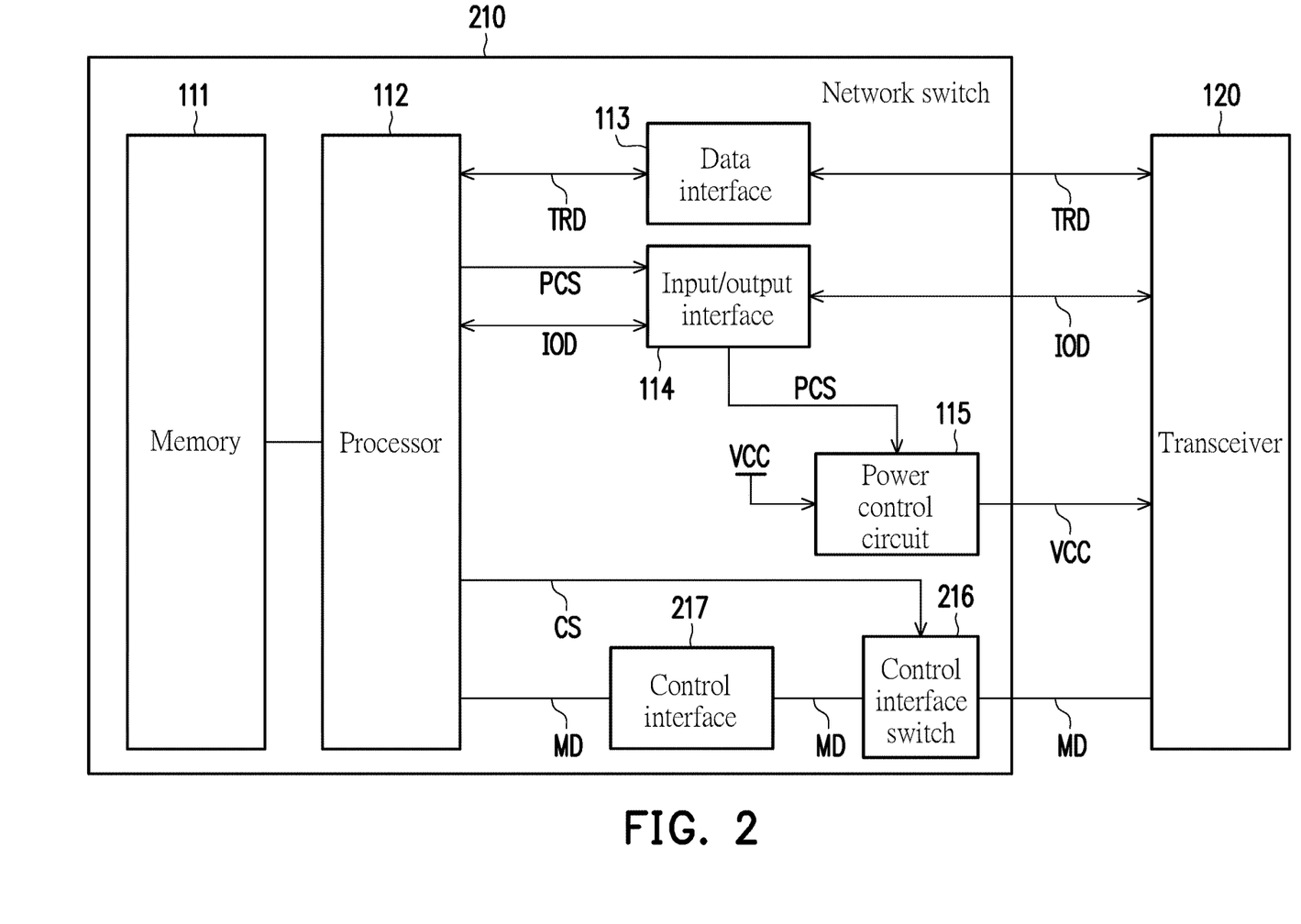
FIG. 2 is a block diagram of a network switch and a transceiver according to another embodiment of the disclosure.

FIG. 2 is a block diagram of a network switch and a transceiver according to another embodiment of the disclosure. The difference between FIG. 2 and FIG. 1 is that a network switch 210 further includes a control interface switch 216 coupled between a control interface 217 and the transceiver 120, and the processor 112 provides the control signal CS to the control interface switch 216 instead. The control interface switch 216 may be, for example, an on/off switch circuit of any kind, and may receive the control signal CS from the processor 112 and cut off or connect the control interface 217 and the transceiver 120 according to the instruction of the control signal CS. When the control interface switch 216 is connected to the transceiver 120, the control interface switch 216 receives the monitoring data MD from the transceiver 120, and is controlled by the control signal CS to provide the monitoring data MD to the processor 112 or not to provide the monitoring data MD to the processor 112. That is, the control interface switch 216 may cut off the transmission of the monitoring data MD between the control interface 217 and the transceiver 120 and at the same time prevent any voltage from being supplied to the transceiver 120.

It should be noted that, by the channel selector in the control interface 117 of FIG. 1 and the control interface switch 216 of FIG. 2, the signal transmission between the control interface 117/control interface 217 and the transceiver 120 may be completely cut off, which can prevent the control interface 117/control interface 217 from still providing the voltage of the communication signal of the transceiver 120 when the main power supply with the voltage VCC is turned off, wherein the voltage would cause the transceiver 120 to fail to shut down properly, and thus cause the transceiver 120 to fail to be restarted successfully. Note that the work flow and link status of the network switch 210 are the same as those of the network switch 110, and the difference lies in the way of cutting off or connecting/reconnecting the control interface 217 and the transceiver 120.

Figure 3:
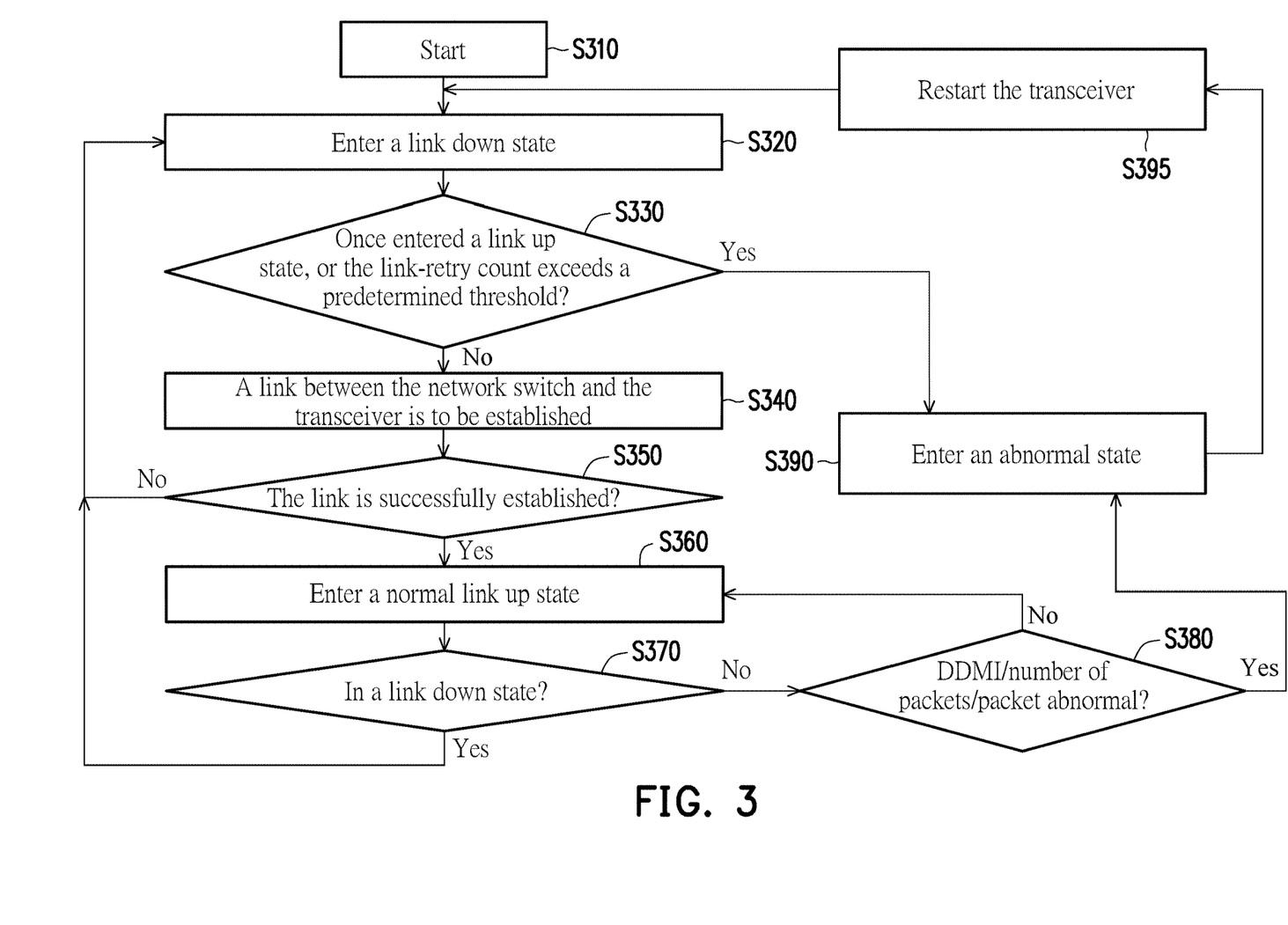
FIG. 3 is a working flowchart of a network switch according to an embodiment of the disclosure.

FIG. 3 is a working flowchart of the network switch 110 according to an embodiment of the disclosure. Referring to FIG. 1 and FIG. 3 at the same time, in step S310, the network switch 110 is started. In step S320, the network switch 110 and the transceiver 120 enter a link down state. Next, in step S330, the processor 112 determines whether the network switch 110 and the transceiver 120 have once entered a link up state (for example, whether there has once been data packets received), or the link-retry count exceeds a predetermined threshold.

If it is determined that the network switch 110 and the transceiver 120 have once entered a link up state, or that the link-retry count exceeds a predetermined threshold, then the step is moved to a step S390; otherwise, the step is moved to a step S340. The predetermined threshold depends on the actual design requirements, but is not limited to thereto.

In step S340, a link between the network switch 110 and the transceiver 120 is to be established. Next, in step S350, the processor 112 determines whether the link between the network switch 110 and the transceiver 120 is successfully established. If it is determined that the link between the network switch 110 and the transceiver 120 is successfully established, the step is moved to a step S360; otherwise, the step is returned to the step S320. In step S360, the processor 112 determines that the network switch 110 and the transceiver 120 enter a link up state. Next, in step S370, the processor 112 determines whether the network switch 110 and the transceiver 120 are in a link down state. If it is determined that the network switch 110 and the transceiver 120 are in a link down state, the step is returned to the step S320; otherwise, the step is moved to a step S380.

In step S380, the processor 112 determines whether the transceiver 120 is in an abnormal state according to the DDMI parameters in the monitoring data MD received from the control interface 117 or the number of packets transmitted and received between the network switch 110 and the transceiver 120. If it is determined that the transceiver 120 is in an abnormal state, the step is moved to a step S390; otherwise, the step returned to the step S360. The sequence of steps shown in FIG. 3 is only an example and not a limitation. For example, in a practicable situation, the sequence of step S370 and step S380 may be adjusted.

In step S390, the processor 112 determines that the transceiver 120 is in an abnormal state. Next, in step S395, the processor 112 restarts the transceiver 120, and the step is returned to the step S320. For the restart operation, the processor 112 first controls the power control circuit 115 to stop providing the voltage VCC of the main power supply to the transceiver 120 through the power control signal PCS, and then controls the power control circuit 115 to re-provide the voltage VCC of the main power supply to the transceiver 120. In one embodiment, when the processor 112 controls the power control circuit 115 to stop providing electrical power to the transceiver 120, the processor 112 also cuts off the connection between the control interface 117 and the transceiver 120. Then, when the processor 112 controls the power control circuit 115 to re-provide electrical power to the transceiver 120, the processor 112 also reconnects the control interface 117 and the transceiver 120.

Figure 4:
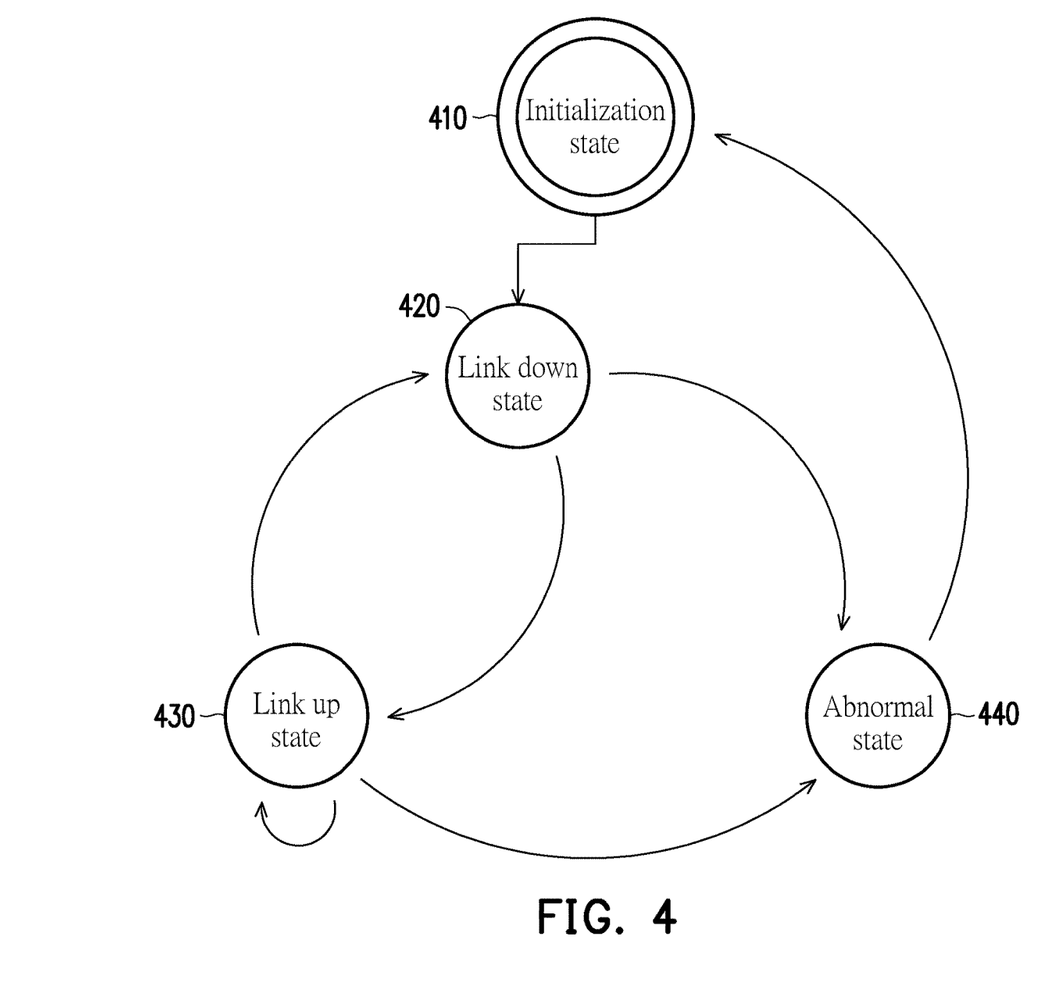
FIG. 4 is a diagram of a link status between a network switch and a transceiver according to an embodiment of the disclosure.

FIG. 4 is a diagram of a link status between a network switch and a transceiver according to an embodiment of the disclosure. In an initialization state 410, the processor 112 performs an initialization operation for establishing a link between the network switch 110 and the transceiver 120, and then the processor 112 makes the network switch 110 and the transceiver 120 enter a link down state 420.

In the link down state 420, the transceiver 120 and the network switch 110 do not transmit data packets to each other, and the processor 112 continuously determines whether the transceiver 120 enters an abnormal state 440 according to the number of data packets transmitted and received through the transceiver 120. For example, the processor 112 may determine periodically or at intervals whether the transceiver 120 is in the abnormal state 440 according to the number of data packets. Moreover, the processor 112 may also continuously determine whether the network switch 110 and the transceiver 120 successfully establish a link and enter a link up state 430. For example, the processor 112 may determine whether the network switch 110 and the transceiver 120 successfully establish a link according to the value of the connection report signal (e.g. the receiving end signal loss signal) in the input/output data IOD.

In the link up state 430, the network switch 110 and the transceiver 120 continuously receive and transmit data, and the processor 112 continuously determines whether the transceiver 120 is in the abnormal state 440 according to the number of data packets transmitted and received through the transceiver 120 or according to the DDMI parameter in the monitoring data MD received from the control interface 117. Moreover, the processor 112 may also continuously determine whether the link between the network switch 110 and the transceiver 120 are disconnected and enter the link down state 420. For example, the processor 112 may determine whether the network switch 110 and the transceiver 120 enter the link down state 420 according to the value of the connection report signal (e.g. the receiving end signal loss signal) in the input/output data IOD.

In the abnormal state 440, the processor 112 first controls the power control circuit 115 to stop providing electrical power to the transceiver 120, and then controls the power control circuit 115 to re-provide electrical power to the transceiver 120. In one embodiment, when the processor 112 controls the power control circuit 115 to stop providing electrical power to the transceiver 120, the processor 112 also cuts off the connection between the control interface 117 and the transceiver 120. Then, when the processor 112 controls the power control circuit 115 to re-provide electrical power to the transceiver 120, the processor 112 also reconnects the control interface 117 and the transceiver 120. The control method may be that the processor 112 directly controls the control interface 117 with the control signal CS, or controls the control interface switch 216 between the control interface 117 and the transceiver 120; the disclosure is not limited thereto.

It is worth mentioning that, referring to FIG. 3 and FIG. 4 at the same time, the processor 112 may determine whether the transceiver 120 is in an abnormal state according to a combination of one or more of the following features: the link status between the network switch 110 and the transceiver 120, the link-retry count between the network switch 110 and the transceiver 120, the number of the monitoring data MD that control interface 117 receives from the transceiver 120, the number of data packets transmitted and received through the transceiver 120, and the abnormal information of the data packets transmitted and received through the transceiver 120.

In one embodiment, referring to step S380 in FIG. 3, when the processor 112 determines that the link status between the network switch 110 and the transceiver 120 is the link up state 430 and the DDMI parameter in the monitoring data MD meets the abnormal condition, the processor 112 determines that the transceiver 120 enters the abnormal state 440. In other words, although it is determined that the network switch 110 and the transceiver 120 are in the link up state 430, when the DDMI parameters received by the network switch 110 from the transceiver 120 are not within the normal operating range, the processor 112 determines that the transceiver 120 enters the abnormal state 440. The DDMI parameters may include, for example, but not limited to, temperature parameters, voltage parameters, transmitted bias current (TX Bias) parameters, transmit power (TX power) parameters, and receive power (RX power) parameters of the transceiver 120. Abnormal conditions or normal operating ranges may be determined according to actual design requirements and the disclosure is not limited thereto.

In one embodiment, referring to step S380 in FIG. 3, when the processor 112 determines that the link status between the network switch 110 and the transceiver 120 is the link up state 430, and the number of data packets transmitted and received through the transceiver 120 is abnormal, the processor 112 determines that the transceiver enters the abnormal state 440. In other words, even if it is determined that the network switch 110 and the transceiver 120 are in the link up state 430, when the number of data packets transmitted and received by the network switch 110 through the transceiver 120 exceeds the normal threshold range, for example, no packets are received, the processor 112 also determines that the transceiver 120 enters the abnormal state 440. The normal threshold range may be determined according to the actual design requirements and the disclosure is not limited to thereto.

In another embodiment, referring to step S380 in FIG. 3, when the processor 112 determines that the link status between the network switch 110 and the transceiver 120 is the link up state 430, and the data packet received through the transceiver 120 is abnormal, the processor 112 determines that the transceiver enters the abnormal state 440. For example, the processor 112 may detect whether the data packet is abnormal through the abnormal information of the data packet, such as, but not limited to, a cyclic redundancy check code (CRC code). When the processor 112 determines that the network switch 110 and the transceiver 120 are in the link up state 430, and the number of data packets determined to be abnormal exceeds a predetermined threshold, it may be determined that the transceiver 120 enters the abnormal state 440. The predetermined threshold may be determined according to actual design requirements, and the disclosure is not limited thereto.

In one embodiment, referring to step S330 in FIG. 3, when the processor 112 determines that the link status between the network switch 110 and the transceiver 120 is the link down state 420, and the link-retry count between the network switch 110 and the transceiver 120 exceeds a predetermined threshold, the processor 112 determines that the transceiver 120 enters the abnormal state 440. The link-retry count is the number of times the network switch 110 tries to establish a link with the transceiver 120, but fails to connect and retries the connection.

In one embodiment, referring to step S330 in FIG. 3, when the processor 112 determines that the link status between the network switch 110 and the transceiver 120 is the link down state 420, and the number of data packets transmitted and received by the network switch 110 through the transceiver 120 is not zero, the processor 112 determines that the transceiver 120 enters the abnormal state 440. It should be noted that the fact that the number of data packets is not zero indicates that the network switch 110 and the transceiver 120 have once entered the link up state 430 and there has once been transmission of data packets, but enter the abnormal state 440 of the link down state 420 due to disconnection of the link.

It is worth mentioning that, referring to FIG. 4, when the processor 112 determines that the transceiver 120 is not in the abnormal state 440, such as in the link down state 420 and the link up state 430, the processor 112 will continuously or periodically determine whether the transceiver 120 enters the abnormal state 440.

Figure 5:
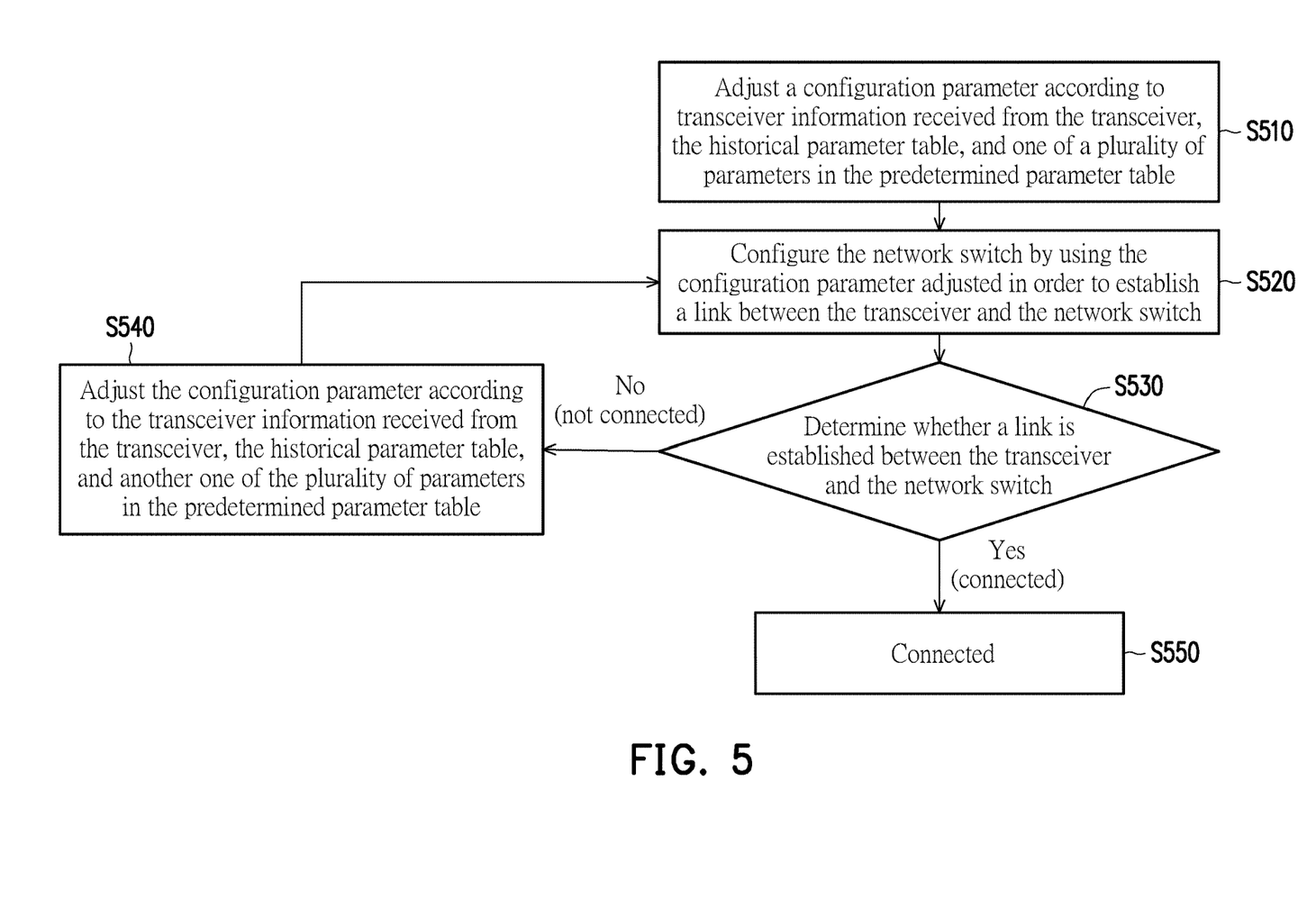
FIG. 5 is a flowchart of establishing a link between a network switch and a transceiver according to an embodiment of the disclosure.

FIG. 5 is a flowchart of establishing a link between the network switch 110 and the transceiver 120 according to an embodiment of the disclosure. For example, referring to FIG. 3 and FIG. 5 at the same time, step S340 in FIG. 3 may be implemented through the process shown in FIG. 5, but the disclosure is not limited thereto. In step S510, the processor 112 adjusts a configuration parameter according to transceiver information received from the transceiver 120, the historical parameter table, and one of a plurality of parameters in the predetermined parameter table.

The transceiver information may be included in the DDMI parameters, and the processor 112 may decide or adjust the configuration parameter according to the transceiver information. The transceiver information is, for example, the part number of the transceiver 120, the transceiver name, and the processor 112 may obtain the transceiving rate parameters and the communication protocol parameters of the transceiver 120 from the part number and the transceiver name of the transceiver 120. In one embodiment, the transceiving rate parameters are, for example, 100 Mbps, 1 Gbps, 2.5 Gbps, 5 Gbps, 10 Gbps, 25 Gbps, 40 Gbps, 100 Gbps, 200 Gbps, and 400 Gbps, but the disclosure is not limited thereto. The communication protocol parameters are, for example, KR, SFI, XFI, USXGMII, 2500BASE-X, SGMII, 25GBASE-KR, 25GBASE-KR-S, 25GAUI, 25GBASE-SR, 25GBASE-LR, 25GBASE-ER, 40GBASE-KR4, 40GBASE-SR4, 40GBASE-FR, 40GBASE-LR4, 40GBASE-ER4, 100GBASE-KR4, 100GBASE-KR2, 100GBASE-SR10, 100GBASE-SR4, 100GBASE-SR2, 100GBASE-DR, 100GBASE-FR1, 100GBASE-LR4, 100GBASE-LR1, 100GBASE-ER4, 100GBASE-ZR, 200GBASE-KR2, 200GBASE-KR4, 200GBASE-SR4, 200GBASE-DR4, 200GBASE-FR4, 200GBASE-LR4, 200GBASE-ER4, 200GAUI-8, 200GAUI-4, 200GAUI-2, 400GBASE-KR4, 400GAUI-16, 400GAUI-8, 400GAUI-4, 400GBASE-SR16, 400GBASE-SR8, 400GBASE-SR4.2, 400GBASE-FR8, 400GBASE-LR8, 400GBASE-ER8, 400GBASE-DR4, 400GBASE-XDR4, 400GBASE-FR4, 400GBASE-LR4-6, 400GBASE-LR4-10, 400GBASE-ZR, but the disclosure is not limited thereto.

The historical parameter table may include, for example, the transceiver type in the historical connection record and the corresponding transceiving rate parameter and communication protocol parameter. After detecting the transceiver information, the processor 112 may adjust the configuration parameter by using the corresponding transceiving rate parameter and the communication protocol parameter in the historical connection record by means of a table lookup in order to establish a link. The predetermined parameter table may include all combinations of transceiving rate parameters and communication protocol parameters that the network switch 110 may support, which is determined according to actual design requirements.

In step S520, the processor 112 configures the network switch 110 by using the configuration parameter adjusted in step S510 in order to establish a link between the transceiver 120 and the network switch 110. Next, in step S530, the processor 112 determines whether a link is established between the transceiver 120 and the network switch 110. If it is determined that a link is established between the transceiver 120 and the network switch 110 (i.e., the transceiver 120 has established a link with the network switch 110), the step is moved to a step S550; otherwise, (i.e., the transceiver 120 and the network switch 110 have not established a link), the step is moved to a step S540.

In step S540, the processor 112 adjusts the configuration parameter according to the transceiver information received from the transceiver 120, the historical parameter table, and another one of the plurality of parameters in the predetermined parameter table that is different from the previous parameter, and the step is then returned to the step S520. In step S550, the processor 112 determines that the transceiver 120 and the network switch 110 are connected.

In one embodiment, the processor 112 may use the transceiver information in the DDMI parameters to decide or adjust the configuration parameter in steps S510 and S540. In another embodiment, the processor 112 may first use the transceiver information in the DDMI parameters, and if the link is not successfully established, use the plurality of parameters of the historical parameter table in sequence until the link is successfully established. In yet another embodiment, the processor 112 may also use the transceiver information in the DDMI parameters first. If the link is not successfully established using the transceiver information, the plurality of parameters in the historical parameter table are used in sequence until the link is successfully established. If the plurality of parameters in the historical parameter table are used in sequence and the link is still not successfully established, the plurality of parameters in the predetermined parameter table are used in sequence until the link is successfully established. Note that the processor 112 may select one or a combination of the transceiver information, the historical parameter table, and the predetermined parameter table, and the sequence of the combination thereof may be arbitrarily adjusted according to actual design requirements.

Figure 6:
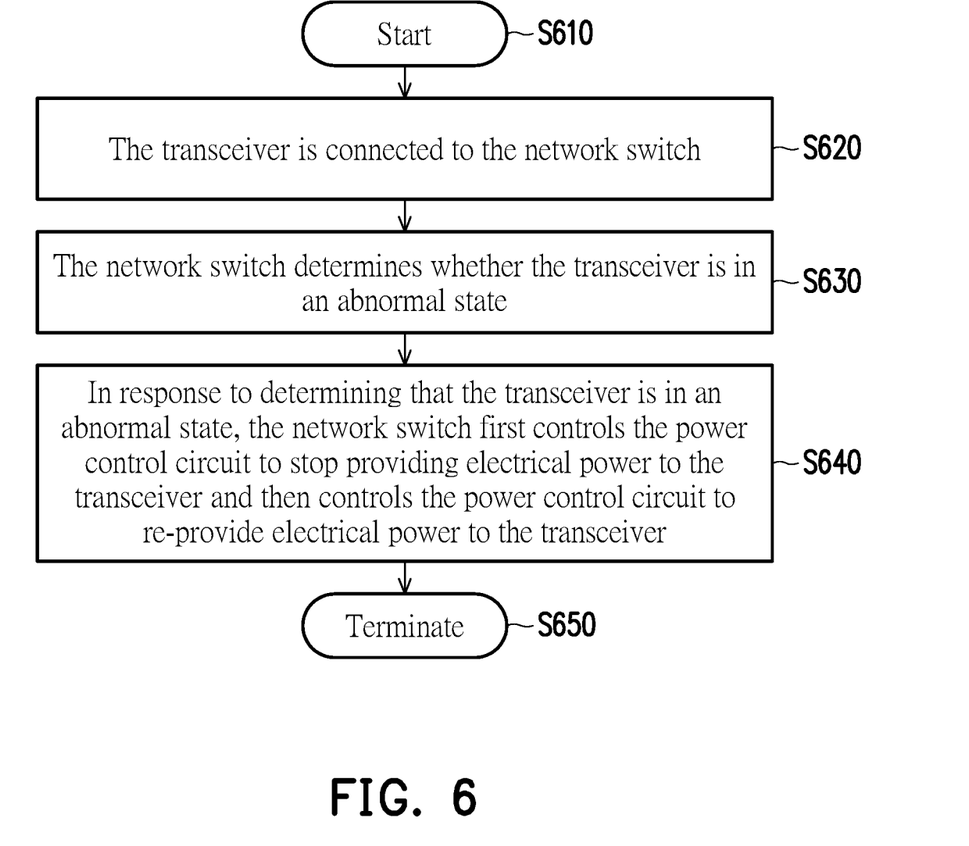
FIG. 6 is a flowchart of a method for a network switch to restart a transceiver thereof according to an embodiment of the disclosure.

FIG. 6 is a flowchart of a method of a network switch to restart a transceiver connected thereto according to an embodiment of the disclosure. In step S610, the network switch 110 starts to enter a work flow of the restart method. In step S620, the transceiver 120 is connected to the network switch 110. Next, in step S630, the network switch 110 determines whether the transceiver 120 is in an abnormal state. In step S640, in response to determining that the transceiver 120 is in an abnormal state, the network switch 110 first controls the power control circuit 115 to stop providing electrical power to the transceiver 120, and then controls the power control circuit 115 to re-provide electrical power to the transceiver 120. In step S650, the network switch 110 terminates the work flow of the restart method.

In summary, according to the disclosure, the processor in the network switch regularly monitors the link status of the transceiver connected, DDMI parameters, and the number of packets transmitted and received, thereby determining whether the transceiver connected is in an abnormal state and deciding whether to restart the transceiver with the power control circuit; and in the process of restarting, the power supply and data transmission between the network switch and the transceiver are also cut off, such that the transceiver may be completely restarted for power supply and data transmission. Since the transceiver is directly restarted by means of hardware, the problem that the transceiver cannot be restarted by software can be overcome. On the other hand, the signal transmission between the control interface and the transceiver may be completely cut off by the control interface switch control inside or outside the control interface, which can avoid the problem that the control interface still provides the voltage of the communication signal to the transceiver when the main power supply is turned off such that the transceiver cannot be shut down and restarted successfully.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A network switch configured to receive data packets through a transceiver, the network switch comprising:
a power control circuit, coupled to the transceiver and controlled to provide electrical power to the transceiver;
a processor, coupled to the power control circuit and configured to:
determine whether the transceiver is in an abnormal state; and
in response to determining that the transceiver is in the abnormal state, first control the power control circuit to stop providing electrical power to the transceiver, and then control the power control circuit to re-provide electrical power to the transceiver; and
a control interface, coupled to the processor and the transceiver, the processor controlling the transceiver through the control interface;
wherein, in response to determining that the transceiver is in the abnormal state, the processor is further configured to cut off a connection between the control interface and the transceiver when controlling the power control circuit to stop providing electrical power to the transceiver, and to reconnect the control interface and the transceiver when controlling the power control circuit to re-provide the electrical power to the transceiver.

2. The network switch as described in claim 1, wherein the control interface further comprises a channel selector, and the channel selector is controlled to cut off or connect the control interface and the transceiver.

3. The network switch as described in claim 1, further comprising a control interface switch, wherein the control interface switch is coupled between the control interface and the transceiver, and is controlled to cut off or connect the control interface and the transceiver.

4. The network switch as described in claim 1, wherein the processor determines whether the transceiver is in the abnormal state according to one or more of the following:
a link status between the network switch and the transceiver, a link-retry count between the network switch and the transceiver, monitoring data received by the control interface from the transceiver, number of data packets transmitted and received through the transceiver, and abnormal information of the data packets transmitted and received through the transceiver.

5. The network switch as described in claim 4, wherein, in response to determining that the link status between the network switch and the transceiver is a link up state, and a monitoring parameter of the monitoring data meets an abnormal condition, the processor determines that the transceiver is in the abnormal state.

6. The network switch as described in claim 4, wherein, in response to determining that the link status between the network switch and the transceiver is a link up state, and the number of data packets transmitted and received through the transceiver is abnormal or the data packets transmitted and received through the transceiver are abnormal, the processor determines that the transceiver is in the abnormal state.

7. The network switch as described in claim 4, wherein, in response to determining that the link status between the network switch and the transceiver is a link down state, and the link-retry count between the network switch and the transceiver exceeds a predetermined value, the processor determines that the transceiver is in the abnormal state.

8. The network switch as described in claim 4, wherein, in response to determining that the link status between the network switch and the transceiver is a link down state, and the number of data packets transmitted and received through the transceiver is not zero, the processor determines that the transceiver is in the abnormal state.

9. The network switch as described in claim 4, wherein the control interface is an Inter-Integrated Circuit Bus, and the monitoring data comprises a digital diagnostic monitoring interface parameter.

10. The network switch as described in claim 1, wherein in response to determining that the transceiver is not in the abnormal state, the processor is further configured to continuously determine whether the transceiver enters the abnormal state.

11. The network switch as described in claim 1, the processor is further configured to adjust a configuration parameter corresponding to the transceiver, and configure the network switch through the configuration parameter in order to establish a link between the transceiver and the network switch.

12. The network switch as described in claim 11, wherein the configuration parameter comprises at least one of a transceiving rate parameter and a communication protocol parameter.

13. The network switch as described in claim 11, the processor adjusts the configuration parameter according to at least one of transceiver information received from the transceiver, a pre-stored historical parameter table, and a pre-stored predetermined parameter table.

14. The network switch as described in claim 1, wherein the transceiver is an optical or electrical network transceiver device with a small form-factor pluggable transceiver type.

15. A transceiver restart method for a network switch, the restart method comprising:
connecting the transceiver to the network switch;
determining whether the transceiver is in an abnormal state;
in response to determining that the transceiver is in the abnormal state, first stopping to provide electrical power to the transceiver, and then re-providing the electrical power to the transceiver; and
in response to determining that the transceiver is in the abnormal state, further cutting off a connection between a control interface in the network switch and the transceiver when stopping to provide electrical power to the transceiver, and reconnecting the control interface and the transceiver when re-providing the electrical power to the transceiver.

16. The restart method as described in claim 15, further comprising:
cutting off or connecting the control interface and the transceiver through a channel selector or a control interface switch.

17. The restart method as described in claim 15, further determining whether the transceiver is in the abnormal state according to one or more of the following:
a link status between the network switch and the transceiver, a link-retry count between the network switch and the transceiver, monitoring data received by the control interface from the transceiver, number of data packets transmitted and received through the transceiver, and abnormal information of the data packets transmitted and received through the transceiver.

18. The restart method as described in claim 17, further comprising:
in response to determining that the link status between the network switch and the transceiver is a link up state, and a monitoring parameter of the monitoring data of the transceiver meets an abnormal condition, determining that the transceiver is in the abnormal state.

19. The restart method as described in claim 17, further comprising:
in response to determining that the link status between the network switch and the transceiver is a link up state, and the number of data packets transmitted and received through the transceiver is abnormal or the data packets transmitted and received through the transceiver are abnormal, determining that the transceiver is in the abnormal state.

20. The restart method as described in claim 17, further comprising:
in response to determining that the link status between the network switch and the transceiver is a link down state, and the link-retry count between the network switch and the transceiver exceeds a predetermined value, determining that the transceiver is in the abnormal state.

21. The restart method as described in claim 17, further comprising:
in response to determining that the link status between the network switch and the transceiver is a link down state, and the number of data packets transmitted and received through the transceiver is not zero, determining that the transceiver is in the abnormal state.

22. The restart method as described in claim 15, further comprising:
in response to determining that the transceiver is not in the abnormal state, continuously determining whether the transceiver enters the abnormal state.

23. The restart method as described in claim 15, further comprising:
adjusting a configuration parameter corresponding to the transceiver; and
configuring the network switch through the configuration parameter in order to establish a link between the transceiver and the network switch.

24. The restart method as described in claim 23, wherein the configuration parameter comprises at least one of a transceiving rate parameter and a communication protocol parameter.

25. The restart method as described in claim 23, further comprising:
adjusting the configuration parameter according to at least one of transceiver information received from the transceiver, a pre-stored historical parameter table, and a pre-stored predetermined parameter table.

* * * * *